Aug. 10, 1926.

W. E. WOODARD 1,595,537

LOCOMOTIVE TRUCK STRUCTURE

Filed May 2, 1925

2 Sheets-Sheet 2

INVENTOR
William E. Woodard
BY
Synnestvedt & Lechner
ATTORNEYS

Patented Aug. 10, 1926.

1,595,537

UNITED STATES PATENT OFFICE.

WILLIAM E. WOODARD, OF FOREST HILLS, NEW YORK.

LOCOMOTIVE TRUCK STRUCTURE.

Application filed May 2, 1925. Serial No. 27,434.

This invention has reference to an improved form of locomotive truck structure particularly such as is used in connection with what is known as an articulated truck frame, that is a construction of truck in which the frame forms with the main frame of the locomotive a kind of articulated structure so disposed that the pulling and buffing strains are transmitted through the truck frame and from this to the locomotive frame.

The first of the objects of this present invention is the provision of a device of the character specified in which the truck frame will be strengthened to carry the pulling and buffing strains referred to while at the same time providing proper clearance for the mounting and movement of the axle box or truck bearing and proper support for other parts associated with the truck as well as a convenient means whereby the truck itself and the superposed parts of the locomotive carried by the truck may be raised or lifted from means provided on the truck frame itself so that in case the locomotive has to be raised the truck structure will not fall away causing the rupture of various connections particularly pipe connections such as are requisite if any booster engine or like device is applied to the wheels of the truck.

Figure 1:
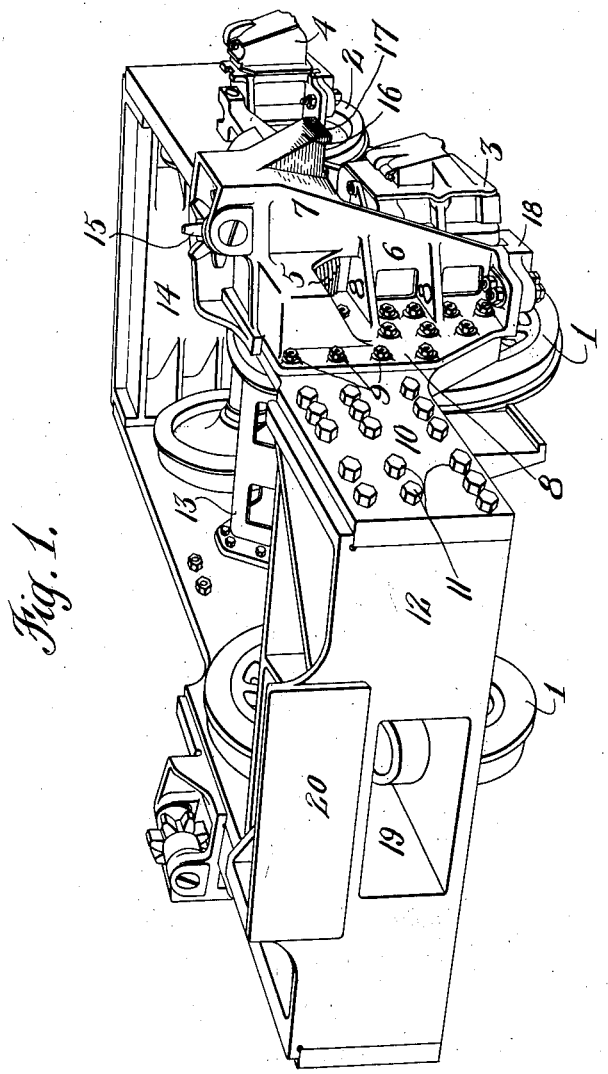
Figure 2:
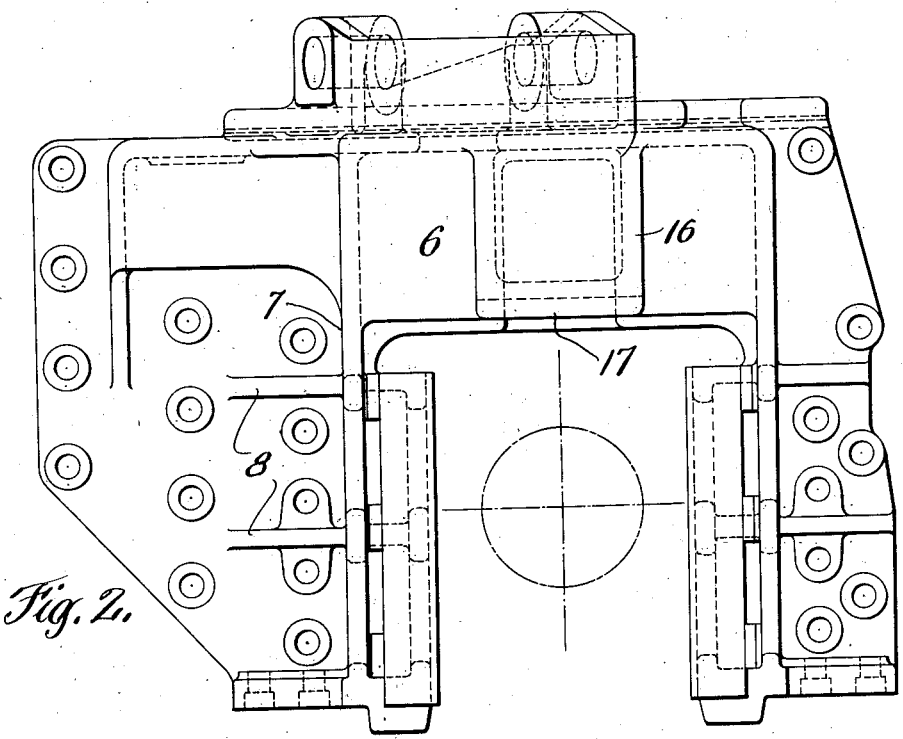
Figure 3:
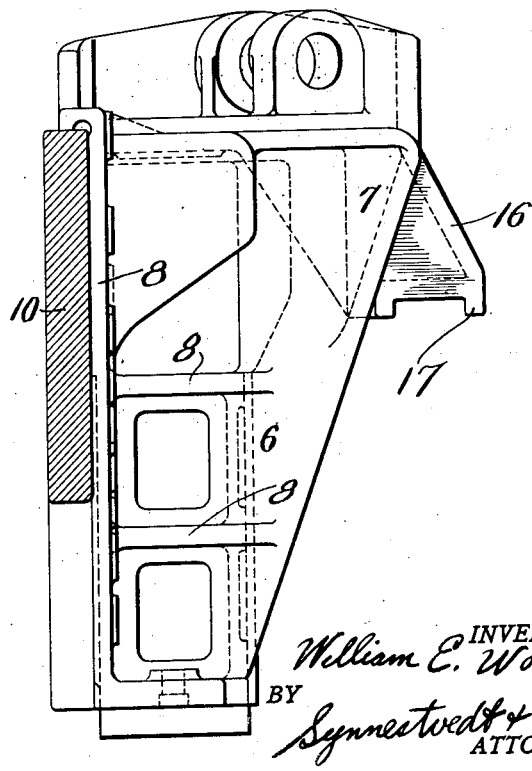

In order that my invention will be better understood, I will proceed to describe the same in connection with the accompanying drawings, in which Fig. 1 is a perspective view showing my improved locomotive truck structure;

Fig. 2 is an enlarged view showing the side elevation of the pedestal casting, and Fig. 3 is an end elevation of the structure shown in Fig. 2 with the connecting side bar of the truck shown in section.

Referring now more particularly to Fig. 1 it will be seen that I have therein shown a locomotive truck having two pairs of wheels 1 and 2 respectively mounted in journal boxes 3 and 4 which support springs 5 of usual construction and are arranged to move freely up and down within the pedestal jaw formed by the casting 6 which has the outwardly projecting bracket 7 and the flanges 8, the casting being secured by a plurality of bolts 9 to the side plates 10 which in turn are secured by the bolts 11 to the cross casting 12.

The side plates are secured together by means of the cross member 13 so that with the member 12 and the member 14 at the opposite end is formed a rigid frame structure which is strongly reenforced by the pedestal casting 6 with its outwardly extended bracket flanges 7 and braces 8.

The upper part of the pedestal casting 6 carries some form of suitable bearing as indicated at 15 on which the weight of the superposed parts of the locomotive rests and there is provided on each side of the truck structure an outstanding lug or hook 16 with a downturned flange 17 (see Fig. 3) so located as to provide a stable means for attaching a link or hoisting chain when it is desired to raise the locomotive for any reason it being possible by this means to lift the entire truck structure with the locomotive and not have the two fall apart with the breakage of connections referred to above which, where any kind of supplemental motor or booster device is employed on the truck, is liable to create serious damage which must be repaired when the parts are replaced in proper position.

It is known that during the construction of the locomotive and also for cases of derailment or shop repairs, some means must be provided for lifting the locomotive and by the means which I have shown I am able to lift the entire articulated truck structure and locomotive as a unit with safety and facility. It will also be noted that the lifting lug 16 is so disposed that in some cases where as in instances of derailment, it may be necessary to raise the weight without any lifting crane being available, a jack of usual construction can be placed conveniently under the lug and used for lifting the weight.

The lower ends of the two pedestal jaws of the casting 6 are connected by means of the binder 18 which passes under the journal box 3 and keeps the boxes and wheels from dropping out of place.

It will be seen further that by the widening of the upper part of the casting of the pedestal jaw structure as is done by the outstanding bracket projection 7 reenforced by the brackets 8, the side frame of the truck structure is substantially strengthened and it is rendered better able to withstand the buffing and pulling stresses transmitted from the connection made by the draft link in the recess 19 and the buffer surface 20.

I claim:—

1. In a supplementary frame structure adapted to be articulated to the main frame of a locomotive, the combination of side members having lifting lugs outside the plane of the frame structure, said lugs being provided with recessed pads engageable by a suitable lifting device.

2. In a supplementary frame structure adapted to be articulated to the main frame of a locomotive, the combination of side members, an axle journalled therein and lifting lugs on the side members extending over and beyond the journals whereby unobstructed access may be had thereto for purposes of lifting.

3. In a supplementary frame structure adapted to be articulated to the main frame of a locomotive, the combination of side members, an axle journalled therein and lifting lugs on the side members extending over and beyond the journals whereby unobstructed access may be had thereto for purposes of lifting, said lugs being provided with a recessed undersurface for secure engagement by a lifting device.

4. A locomotive truck including a frame having lifting lugs extending beyond the points of greatest transverse overall dimension of the truck.

5. In a supplementary frame structure adapted to be articulated to the main frame of a locomotive, the combination of side members having lifting lugs outside the plane of the frame structure, said lugs being formed with lifting device receiving seats.

In testimony whereof, I have hereunto signed my name.

WILLIAM E. WOODARD.